(12) United States Patent
Trimberger

(10) Patent No.: US 8,418,096 B1
(45) Date of Patent: Apr. 9, 2013

(54) METHODS FOR INHIBITING REVERSE ENGINEERING OF CIRCUIT DESIGNS

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/484,607

(22) Filed: May 31, 2012

(51) Int. Cl.
G06F 17/50 (2006.01)
(52) U.S. Cl.
USPC .......................................... 716/104; 716/116
(58) Field of Classification Search .......... 716/100–106, 716/116
See application file for complete search history.

(56) References Cited

U.S. PATENT DOCUMENTS

| | | | |
|---|---|---|---|
| 7,107,560 B1 | 9/2006 | New | |
| 7,620,925 B1 * | 11/2009 | Manohararajah et al. | 716/138 |
| 8,024,688 B1 | 9/2011 | Trimberger | |
| 2003/0149953 A1 * | 8/2003 | Whitaker et al. | 716/17 |
| 2007/0198959 A1 * | 8/2007 | Schubert et al. | 716/4 |

OTHER PUBLICATIONS

Xilinx, Inc., *OPB Ethernet Media Access Controller (EMAC)* (v1.00m), DS435 (v1.23.1), Oct. 8, 2003, pp. 1-48, Xilinx, Inc., San Jose, California, USA.

* cited by examiner

*Primary Examiner* — Binh Tat
(74) *Attorney, Agent, or Firm* — LeRoy D. Maunu; Lois D. Cartier

(57) ABSTRACT

Various methods for inhibiting reverse engineering of a circuit design are provided. In one embodiment, a circuit design is initially mapped to a plurality of identified hardware components of a target device using a first table that indicates a first set of logic patterns that hardware components of the target device can implement. Unused hardware components are identified, and at least one logic pattern of the circuit design is remapped to one of the unused hardware components using a second mapping table. The second table indicates a second set of logic patterns, not indicated by the first mapping table, that one of the unused hardware components is configurable to implement.

8 Claims, 7 Drawing Sheets

US 8,418,096 B1

METHODS FOR INHIBITING REVERSE ENGINEERING OF CIRCUIT DESIGNS

FIELD OF THE INVENTION

One or more embodiments relate to inhibiting reverse engineering of circuit designs implemented on programmable integrated circuits (ICs).

BACKGROUND

Programmable ICs include user configurable circuitry capable of implementing various digital logic operations. There are several types of programmable ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input output blocks (IOBs), and programmable interconnect lines that route and transmit signals between the CLBs and IOBs. Each CLB includes look-up tables and other configurable circuitry that are programmable to implement logic functions. At startup, function blocks of CPLDs, CLBs of FPGAs, and interconnect lines are programmed according to configuration data (referred to as a configuration bitstream) that is loaded into a configuration memory of the programmable IC.

Circuit designs implemented in programmable ICs have become complex. Due to the time and investment required for design and debugging, it is desirable to protect the design from unauthorized copying. Recently, attempts have been made to reverse engineer configuration bitstreams to obtain logic of a circuit design for unauthorized use. For example, it is possible to retrieve configuration data from a configured programmable IC during startup or through analysis of the programmable IC during operation. The retrieved configuration data can be analyzed to determine the circuitry and logic associated with each bit of the configuration data. Recovery of circuit design logic allows an unauthorized party to incorporate the circuitry into other designs or implement copies of the circuit design on other programmable ICs.

SUMMARY

In one embodiment, a processor-implemented method for the synthesis of a hardware description language (HDL) design is provided. A circuit design is initially mapped to a plurality of identified hardware components of a target device using a first table. The first mapping table indicates, for each of the hardware components, a respective first set of logic patterns that the hardware component is configurable to implement. After mapping using the first mapping table, hardware components of the target device to which no part of the circuit design was mapped are identified as unused hardware components. Using a second table that indicates a second set of logic patterns that one of the unused hardware components is configurable to implement, a logic pattern of the circuit design that may be implemented using a selected one of the unused hardware components is identified. The second set of logic patterns included in the second mapping table is not associated with the selected hardware component in the first table. The circuit design is then remapped to have the identified logic pattern mapped to the one of the unused hardware components.

In another embodiment, a method of placement-and-routing a circuit design is provided. An initial place-and-route of the circuit design is performed to produce a first placed-and-routed circuit design. A routed signal in the first placed-and-routed circuit design having an amount of slack greater than a slack threshold is identified. A sub-circuit is then inserted into the first placed-and-routed circuit design. The sub-circuit is configured to be subject to a race condition that causes the placed-and-routed circuit design to operate incorrectly if the routed signal has a slack greater than the slack threshold, and operate correctly if the routed signal is routed to have a slack less than the slack threshold. The identified signal is then rerouted to have a delay greater than delay of the identified signal prior to the rerouting to produce a second placed-and-routed circuit design. The slack of the rerouted signal is less or equal to than the slack threshold. The second placed-and-routed circuit design is logically equivalent to the first placed-and routed circuit design with respect to behavior and timing of inputs and outputs.

In yet another embodiment, a method of configuring a programmable IC to implement a circuit design is provided. During startup of programmable IC, configuration data is stored in configuration memory of the programmable IC. The configuration data implements a first circuit that is inconsistent with correct operation of the circuit design and implements a second circuit that is consistent with correct operation of the circuit design. Following startup (e.g., during operation of the second circuit), the obscured configuration data is rearranged in the configuration memory, to implement the circuit design.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which:

FIGS. 3-1 and 3-2 show a sub-circuit subject to a race condition that may be used to inhibit reverse engineering in accordance with one or more embodiments;

FIGS. 3-3 shows waveforms of signals in the sub-circuits shown in FIGS. 3-1 and 3-2;

DETAILED DESCRIPTION

Reverse engineering a circuit design is a multi-step process. A bitstream that implements a circuit design can be determined by intercepting data transferred during programming at startup or by probing circuitry of a programmable IC during operation. The bitstream may then be analyzed to determine the logic implemented by the circuits from a high-level perspective. The high-level expression of the logic may be in a hardware description language (HDL) circuit design, for example. By determining the HDL logic, desired sub-circuits may be integrated into other circuit designs and/or mapped, placed, and routed for another target device.

Conversion of a bitstream to an HDL circuit design is a difficult task. To ease and expedite this process, a reverse engineer may use an automated software tool that attempts to infer logic implemented by each hardware component based on a mapping of typical logic patterns implemented by the respective hardware components. One or more embodiments obfuscate the design and inhibit automated inference processes by modifying a mapped circuit design to implement some logic patterns of a circuit design using hardware that is not typically used to implement those logic patterns. If automated tools are used to infer the logic implemented by the mapped design, the tools will incorrectly infer that the hardware components are used to implement the typical logic patterns.

Figure 1:
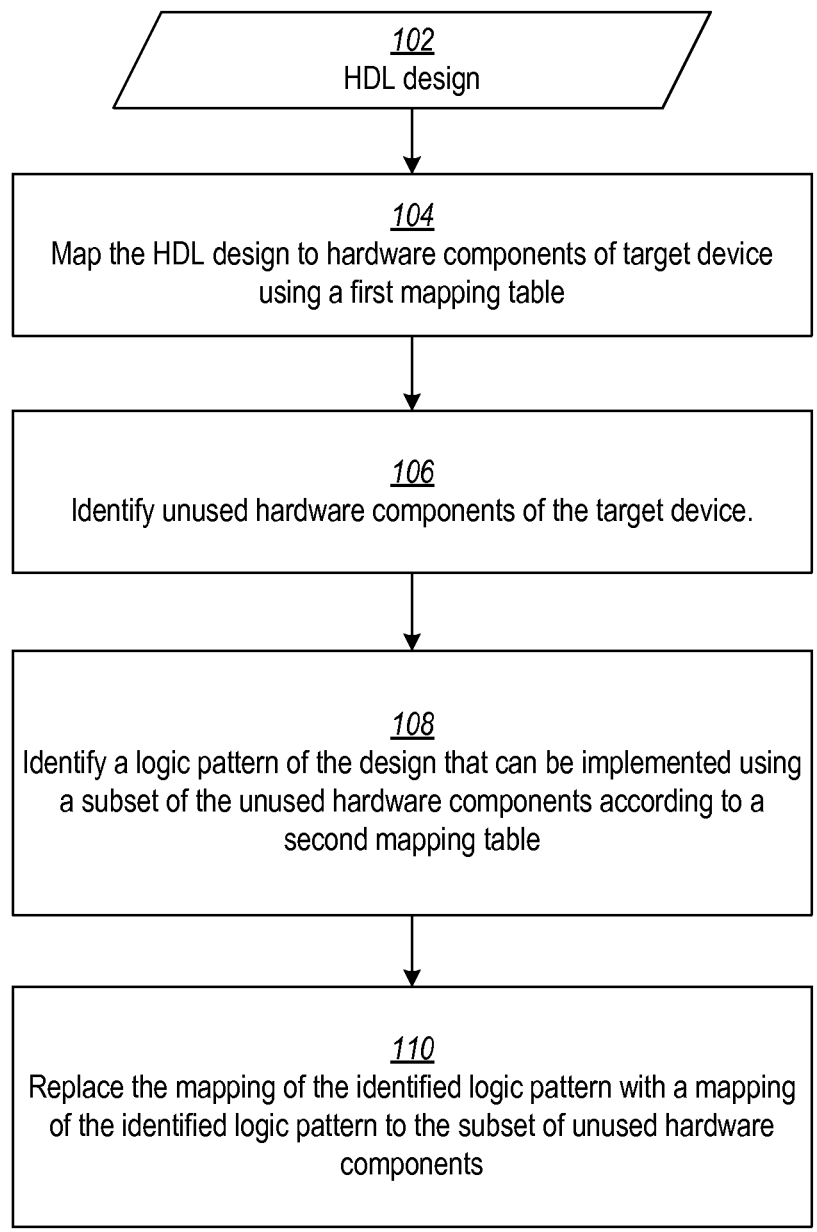
FIG. 1 shows a flowchart of a first process for inhibiting reverse engineering of a circuit design in accordance with one or more embodiments.

FIG. 1 shows a flowchart of a process for inhibiting reverse engineering of a circuit design in accordance with one or more embodiments. A synthesized HDL circuit design 102 is mapped to components of a target device using a first mapping table at process block 104. The first mapping table indicates, for each of the hardware components of the target device, a respective set of logic patterns that the hardware component is configurable to implement.

After mapping the synthesized HDL design using the first mapping table at block 104, unused components of the target device are identified at process block 106. Using a second mapping table, a logic pattern of the design is identified at block 108 that can be implemented using a subset of the unused hardware components. The mappings of logic patterns to hardware components indicated in the second mapping table are different from the mappings of logic patterns to hardware components indicated in the first table. The alternative mappings in the second mapping table allow selected hardware components to be used to implement logic patterns that the first mapping table does not support. The second mapping table supports lesser known implementations of logic patterns on the selected hardware components. For each of one or more hardware components of the target device, the second mapping table has an associated set of logic patterns. The logic patterns in the set associated with a hardware component in the second mapping table are not associated with that same hardware component in the first mapping table. Accordingly, the first mapping table does not indicate that the identified logic pattern may be implemented with the subset of unused hardware components. The mapped circuit design is adjusted at process block 110 to implement the identified logic pattern of the circuit design using the unused components identified by the second mapping table rather than the hardware components indicated by the first mapping table. In some embodiments, the hardware components used by the identified logic pattern are considered as unused hardware components.

If automated processes were used to infer a circuit design from the mapped design, the process would infer the typical mapping indicated by the first mapping table. By implementing logic of a circuit design using hardware components that are typically used to implement different logic, the inference process performed by an attacker will incorrectly infer that the circuit design includes the typical logic associated with the hardware component. Although the atypical mapping (i.e., the second mapping table) may be discovered by a skilled engineer upon close inspection of the placed-and-routed design, considerably more time and expense will be required for such manual inspection and analysis. In this manner, automated reverse engineering processes are inhibited.

It is understood that various hardware components may be atypically configured to implement certain logic patterns rather than logic patterns that are typically understood to be implementable by the hardware components. For example, a multiplexor circuit is typically used to select between one of several inputs, and connect only the one selected input to an output of the multiplexor circuit. However, for some target devices, multiplexor hardware may be configured to connect multiple inputs to the output at the same time. In one embodiment, the second mapping table indicates that the multiplexor may be configured to act as a node connecting two or more of the inputs. When the target device is configured, the multiplexor circuit is configured to connect the two inputs to the output at the same time. Accordingly, a direct connection is provided between the two inputs, and the multiplexor circuit acts as a node. In some implementations using a programmable IC, an input left unconnected will drift to a known value, for example, a logic 1. Therefore, in one embodiment, the second mapping table indicates that the multiplexor control input is left unconnected in the circuit and the signal is connected to the 1 input. In some implementations using a programmable IC, the multiplexor has independent control signals on its inputs. If two controls are enabled, the two inputs are connected to one another. Therefore in one embodiment, the second mapping table indicates that the multiplexor has more than one input enabled with the result that a connection is formed between the two inputs.

As another example, programmable ICs generally include for each input/output (I/O) pin, circuitry that allows the pin to be configured to be used as an input, as an output, or as both (alternating between acting as an input for one signal path of the circuit design and as an output for another signal path of the circuit design). In one embodiment, an I/O circuit is atypically used as a node connecting a first signal path to a second signal path. The I/O circuit is configured as an input to a first signal path and as an output for a second signal path, where the I/O circuit always drives the output with the second signal path. In this configuration, the signals of second signal path are also forwarded to the first signal path. In this manner, the I/O circuit implements the logic pattern of a node. Using this mapping, an inference tool would likely infer that the I/O circuit is being used as an input for the first signal path rather than as node to connect the first and second signal paths.

As another example, an I/O circuit may be atypically configured to tie an input to a high or low voltage to generate a constant value. Using this mapping, an automated inference tool would likely infer that the I/O circuit is being used as an input rather than as a circuit that generates a constant value.

As another example, a look-up-table (LUT) may be atypically configured to implement the logic pattern of a latch. For example, this may be accomplished by programming the LUT to implement the function "if HOLD: then FB, else: IN" and connecting the output of the LUT to the FB input of the LUT. This requires only three inputs of the LUT. The other inputs can be used to form a function of multiple inputs to the latch storage. In some programmable ICs, such as some FPGAs, any multiplexor can be configured to be a latch, including the multiplexor that is part of the carry chain.

As yet another example, latches may be atypically configured to implement the logic pattern of a gate. For instance, a latch may be configured to use one data input as a first input and the clock as a second data input. In such a configuration, the output corresponding to the first input will be asserted high only when the both the first input and the clock are asserted high. Similarly, control inputs of a flip-flop (e.g., clock, enable, clock gating, etc.) may be used to configure the flip-flop to implement various logic patterns typically implemented by gates.

In some other embodiments, obfuscation may be added by the addition of sub-circuitry subject to a race condition, which requires signals to be routed non-optimally in order for the circuit design to function correctly. These embodiments exploit a general principle that when a circuit is placed-and-routed, the routing algorithms attempt to minimize delay of the signals. Because the signal is routed non-optimally in the obfuscated implementation, if logic of a circuit design is reverse engineered to recover the original circuit design logic and copied into another circuit design, the placement-and-routing of the new circuit design would cause the signal to be routed more optimally. As a result of the more optimized routing, the race condition of the sub-circuit will cause the placed-and-routed circuit design to function incorrectly.

Figure 2:
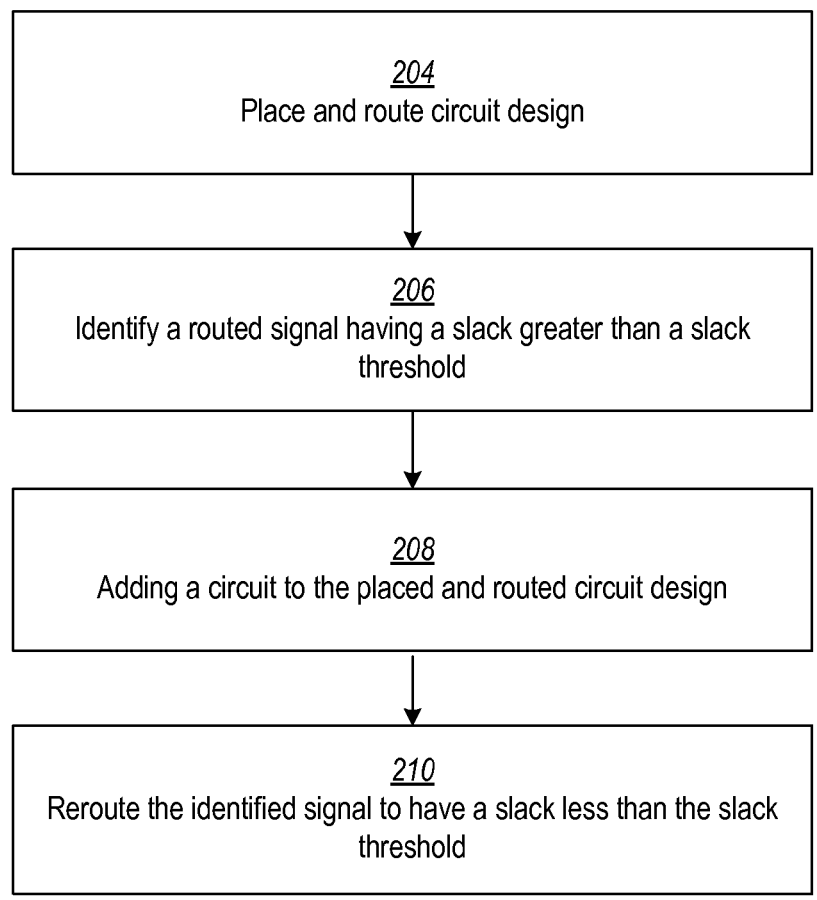
FIG. 2 shows a flowchart of a second process for inhibiting reverse engineering of a circuit design in accordance with one or more embodiments.

FIG. 2 shows a process for inhibiting reverse engineering of a circuit design. A circuit design is placed-and-routed at process block 204. As part of the placement-and-routing, timing analysis is performed to determine slack of each signal. Slack refers to the difference between the delay incurred by a routed signal and the maximum time for which the signal may be delayed without resulting in incorrect operation of the circuit. The maximum delay may be determined, for instance, to ensure that proper setup and hold times of latches are maintained. As one example, a circuit design may require a signal be delayed no more than 100 microseconds to ensure correct operation. If the signal is routed to have a delay of only 10 microseconds, the routed signal has a slack of 90 microseconds. In other words, the signal may be rerouted on a path with up to 90 micro-seconds more delay if required, for instance, to route another signal in the current path of the signal.

The placed-and-routed circuit design is analyzed at process block 206 to identify a routed signal that has a slack greater than a slack threshold. After identifying a signal having the required slack, a sub-circuit is added to the placed-and-routed circuit design at block 208. The added sub-circuit causes the circuit to operate correctly only when the identified signal is routed non-optimally to have a slack that is less than the slack threshold. The identified signal is rerouted at block 210 to increase the delay of the signal such that slack is less than the slack threshold. As a result of the rerouting, the sub-circuit causes the circuit to operate correctly. However, if the modified circuit design is copied and placed-and-routed for another target device, the routing algorithm will likely optimize the signal to have a slack that is greater than the slack threshold. As a result, the sub-circuit will prevent the circuit from operating correctly.

Figures 1, 3:
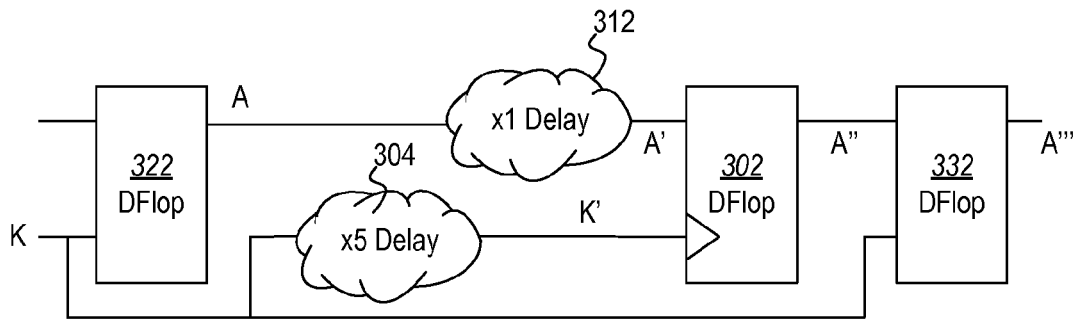
Figures 2, 3:
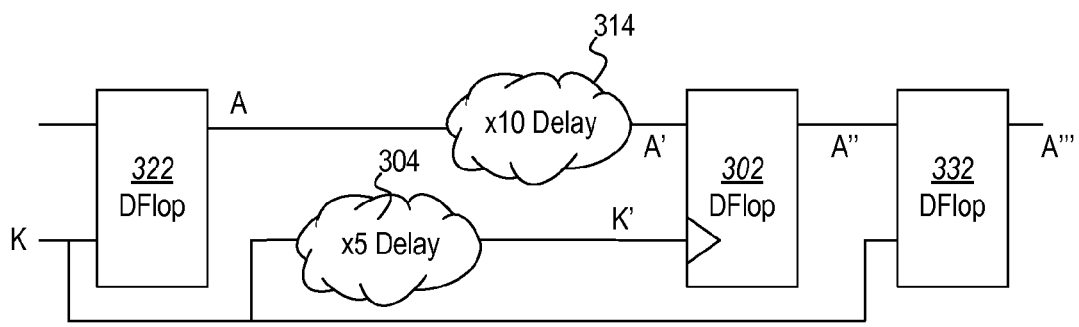
Figure 3:
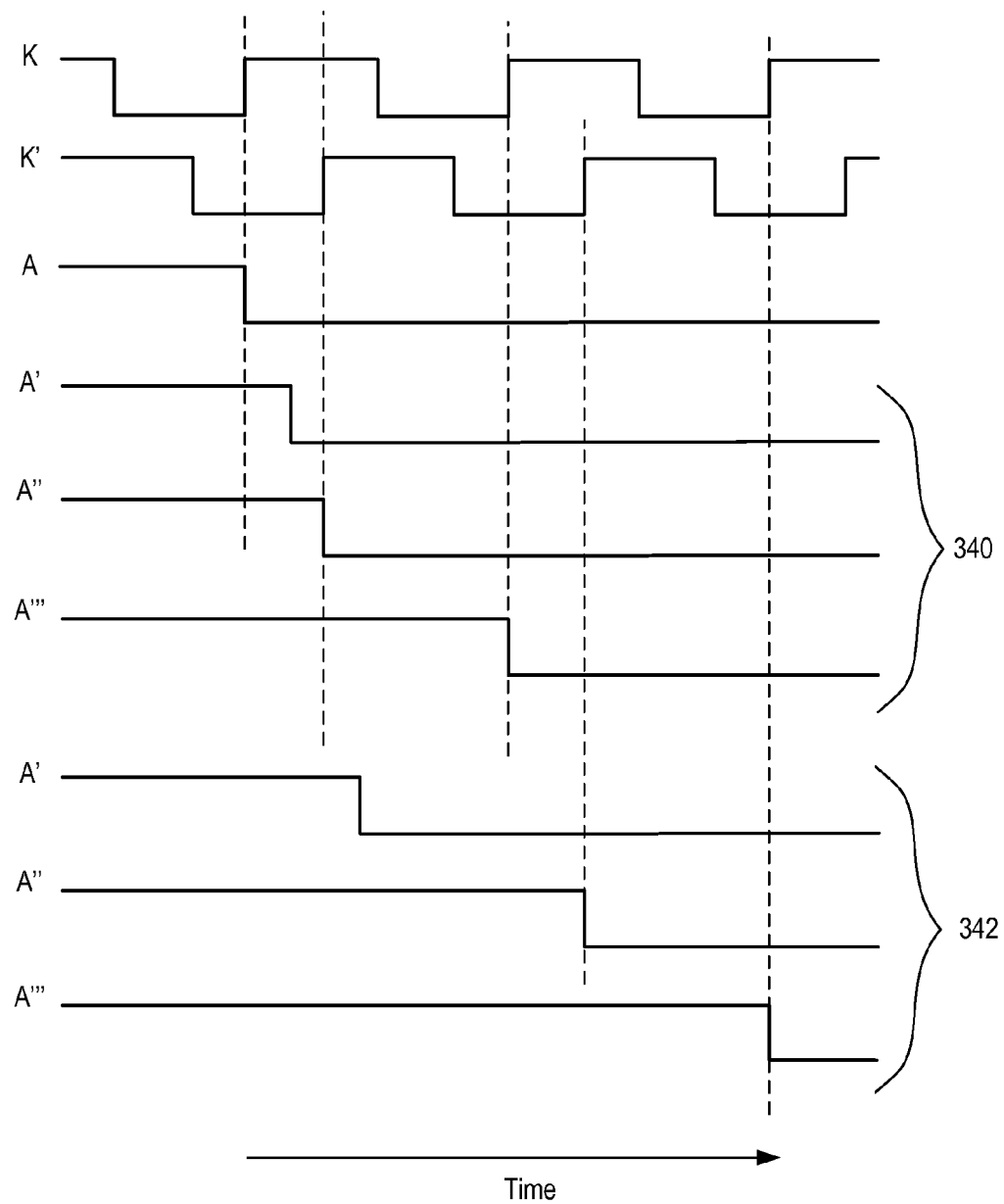

FIGS. 3-1 and 3-2 show an example sub-circuit that is subject to a race condition. The sub-circuit outputs signal A''', which is needed by the circuit design for correct operation, only when signal A is routed such that slack is less than a slack threshold. Otherwise, the sub-circuit outputs A''', an incorrect signal that will cause the circuit design to operate incorrectly. As explained below, the slack threshold in this example is approximately equal to the delay of the clock signal K. The delay is represented by cloud 304, and the delayed clock signal is referenced as K'. This delay may be implemented by a gate in the programmable IC, by routing delay in programmable interconnect in the programmable IC, or by known skew values in the clock distribution network in the programmable IC. In this example, the delay of clock signal K' 304 is described as introducing 5 units of delay.

The routing of signal A in the sub-circuit is illustrated by clouds 312 in FIGS. 3-1 and 314 in FIGS. 3-2. Signal A' is the result of signal A being delayed by the routing. In this example, routing 312 in FIGS. 3-1 is described as introducing 1 unit of delay and routing 314 in FIGS. 3-2 is described as introducing 10 units of delay. In this example, signal A is represented as an output of flip-flop 322 clocked by K. Signal K is delayed by cloud 304 before being input to flip-flop 302. Edges of signal A' are compared to edges of clock signal K' to provide an indication of the slack of the routed signal A' in comparison to the slack threshold. The correct operation of the circuit delays the signal A by only one clock cycle to generate signal A'''. This behavior is contrary to the expected operation of the circuit because the race condition causes Dflop 302 to not delay the signal. FIGS. 3-1 shows the sub-circuit with signal A routed such that A' has a delay 312 that is less than the delay of the cloud 304, which causes Dflop 302 to capture signal A' on the same cycle of clock K, delayed by 304. The subsequent transition of clock K will capture signal A'' in Dflop 332. FIGS. 3-2 shows the sub-circuit with signal A routed such that A' has a delay 314 that is greater than the delay of the cloud 304, which causes the sub-circuit to output A''' with two cycles of delay, which is not the intended delay of the circuit, but is consistent with normal functioning of clocked circuits. In FIGS. 3-2, the signal A' will be captured in Dflop 302 on the cycle after the cycle on which signal A was generated from Dflop 322. Signal A'' will be captured in Dflop 332, giving A''' two cycles after A.

FIGS. 3-3 shows waveforms for the signal A, A', A'', and A''' and clock signals K and K' discussed in connection with FIGS. 3-1 and 3-2. Waveforms 340 show signals A', A'', and A''' resulting from delay 312 shown in FIGS. 3-1. Waveforms 342 show signals A', A'', and A''' resulting from delay 314 shown in FIG. 3-2.

Correct operation of this circuit assumes the delay 304 will be greater than the signal delay (312 and 314). The longer delay on the clock to K' causes the output of flip-flop 322 to be updated by the clock K and to arrive at the input of flip-flop 302 before the clock K'. Thus flip-flop 302 captures that same signal that was the input to flip-flop 322. Flip-flop 322 contributes no cycle delay. Output A'' of flip-flop 302 is cycle-aligned with A. The following flip-flop 332 outputs the same signal delayed by one clock. However, if delay 312 is less than delay 304 (as shown in FIGS. 3-1), flip-flop 302 captures the signal A' with the same value as flip-flop 322, and flip-flop 332 emits A' delayed by only one clock of K. A''' is delayed by two cycles of the clock from signal A. The difference in signal delays can be caused by unexpected routing of signal A or signal K. Flip-flop 302 can be optionally constructed using a flip-flop of the programmable IC, a latch in the programmable IC or other logic in the programmable IC forming a flip-flop or latch.

The sub-circuit may be used to enable or disable forwarding of a correct signal expected by the circuit design for correct operation as discussed in connection with FIGS. 3-1 through 3-3. Alternatively, the output of the flip-flop can be used as an enable signal for other circuits included in the circuit design. In the embodiment of FIGS. 3-2, since the signals A'' and A''' are offset in time relative to the signals required for proper operation, the resulting circuit will function incorrectly. If signal A''' is part of a state machine, for example, the state machine will enter an incorrect state, causing a malfunction of the circuit. It is understood that the circuit shown in FIGS. 3-1 and 3-2 is only one possible circuit that is subject to a race condition and that may be used for controlling correct operation of connected circuitry. Those skilled in the art will recognize that other circuits may be used as well.

One or more embodiments inhibit reverse engineering of a configuration bitstream by obfuscating the circuit design in the initial configuration of configuration memory. Such obfuscation can be performed by organizing the bitstream to initially implement circuitry that does not correctly implement the logic of the circuit design. For example, configuration data may initially be placed out of order in the configuration memory such that the resulting circuit does not correctly implement the circuit design. During initial operation, startup, or booting of the circuit, configuration data may be rearranged (e.g., copied or relocated from one portion of the configuration memory (or an internal or external memory) to another portion of the configuration memory, replacing the initial circuitry that does not correctly implement the logic of the circuit design. Once rearranged, the overall circuit operates correctly. The rearranging may entail moving, reformatting, decrypting, decoding, or any other manipulation, alone or in combination, of the stored configuration data to arrive at configuration data that implements the circuit to operate correctly.

For ease of reference, configuration data that is arranged out of order in the configuration memory, such that the implemented circuit does not correctly implement the circuit design, may be referred to as obscured configuration data.

Figure 4:
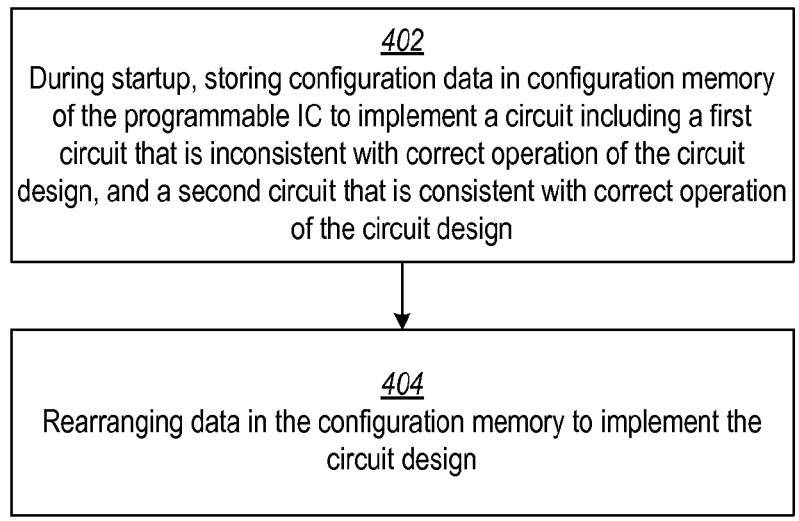
FIG. 4 shows a flowchart of a third process for inhibiting reverse engineering in accordance with one or more embodiments.

FIG. 4 shows a flowchart of a process for obfuscation of a circuit design in accordance with one or more embodiments. Obscured configuration data is initially stored in the configuration memory of the programmable IC during startup at block 402. The obscured configuration data implements a first circuit that is inconsistent with correct operation of the circuit design and implements a second circuit that is consistent with correct operation of the circuit design. Following startup (e.g., during operation of the second circuit), the obscured configuration data is rearranged in the configuration memory, at block 404, to implement the intended circuit design.

Figure 5:
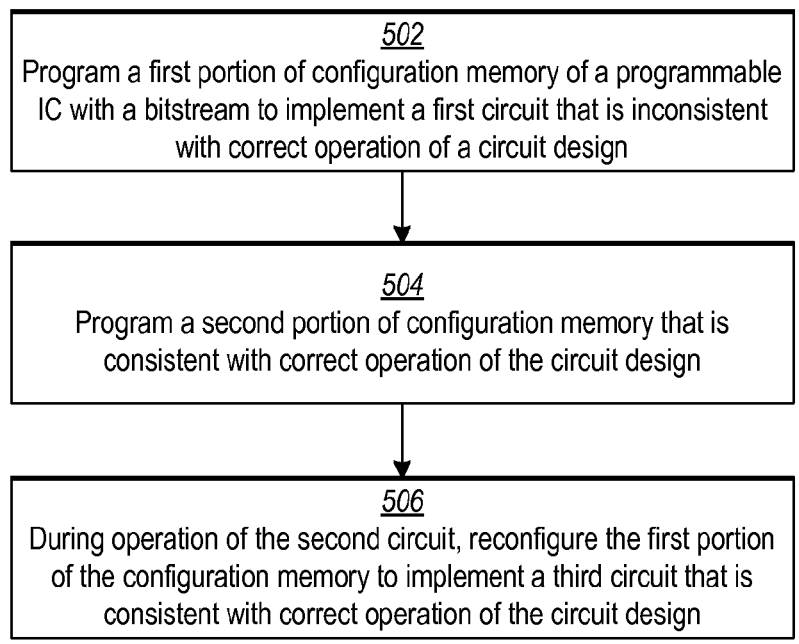
FIG. 5 shows a flowchart of a third process for inhibiting reverse engineering in accordance with one or more embodiments.

FIG. 5 shows a flowchart of an example process for obfuscation of a circuit design in accordance with one or more embodiments. A first portion of configuration memory of a programmable IC is programmed with a first circuit at process block 502. The first circuit is inconsistent with correct operation of the circuit design. A second portion of the configuration memory is programmed with a second circuit that is consistent with correct operation of the circuit design at process block 504. The configuration data implementing the first and second circuits represents an obscured version of configuration data used to implement the circuit design. During operation of the second circuit, the first portion of the configuration memory is reconfigured, at process block 506, to implement a third circuit that is consistent with correct operation of the circuit design. The configuration data for the third circuit may, for example, be programmed by the bitstream in another portion of configuration memory and relocated to the first portion at process block 506.

It is understood that the configuration data for the third circuit may initially be stored in a number of locations. For example, in one implementation the configuration data for the third circuit may initially be implemented in configuration memory used to configure programmable resources of the programmable IC. In another implementation, the configuration data may be initially stored in a BRAM that is available for use by circuitry of the circuit design. In yet another implementation, the configuration data may be stored outside the programmable device and read into the device by the startup circuitry. In some embodiments, logic of a circuit design rather than circuitry may be reorganized during operation. For instance, data values stored in a portion(s) of configuration memory that controls one or more LUTs may be shifted to a different portion(s) of configuration memory for controlling one or more LUTs to change the operation of the implemented circuitry.

The movement of data from one portion of configuration memory to another may be controlled by various circuits. In one embodiment, the relocation of configuration data is controlled by the circuit used to control initial configuration of the configuration memory with the bitstream. In another embodiment, the bitstream may implement a startup control circuit in programmable resources to perform the relocation of configuration data during initial operation of the circuit design. In another embodiment, the movement of data is accomplished using programmable logic that accesses the configuration mechanism through an internal configuration access port. In some embodiments, the data representing the third circuit is stored in an encrypted form and is decrypted before being relocated.

Figure 6:
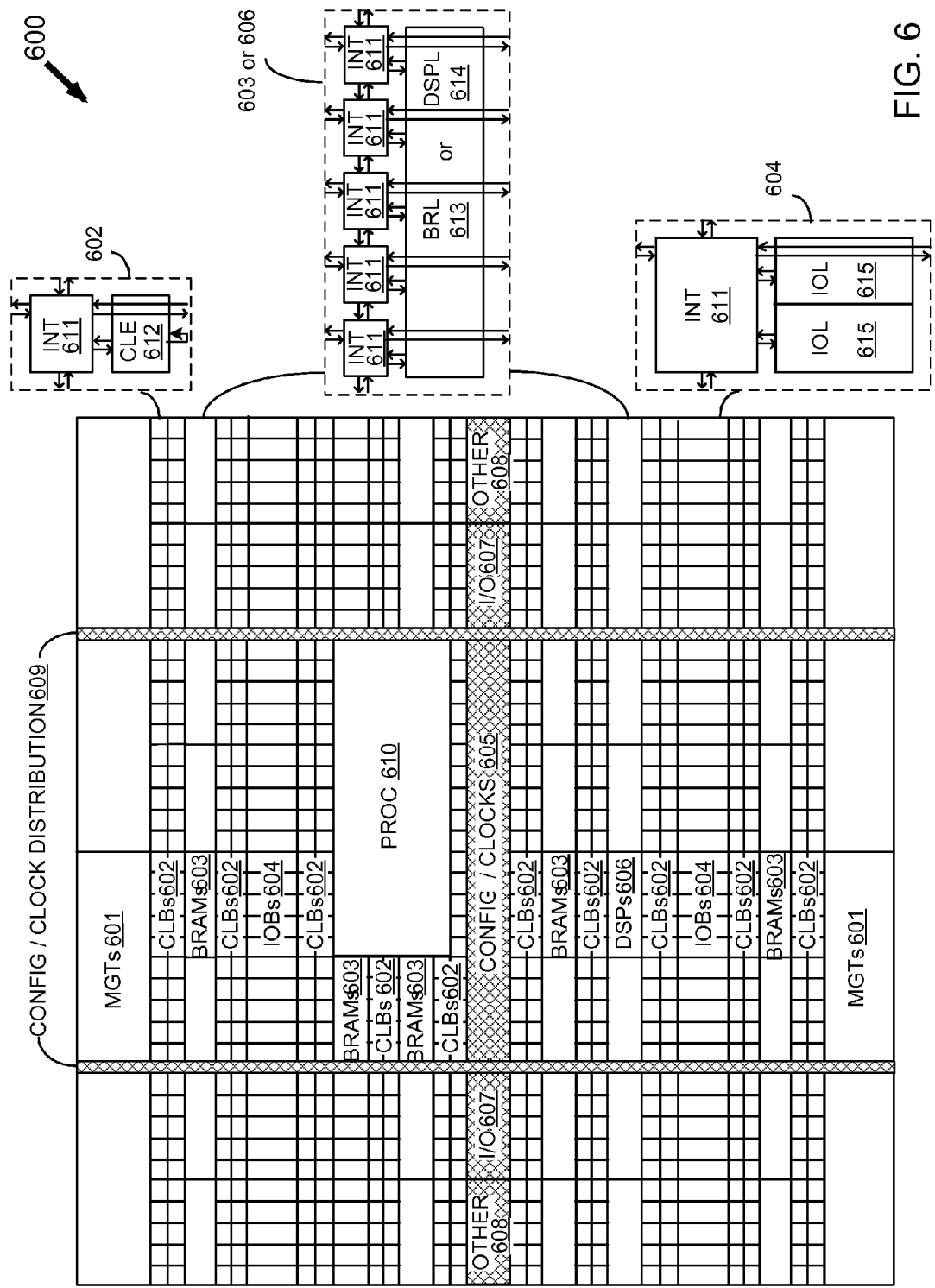
FIG. 6 illustrates a block diagram of a programmable integrated circuit that may be configured to inhibit reverse engineering in accordance with one or more embodiments of the invention.

FIG. 6 is a block diagram of an example programmable logic integrated circuit that may be configured to inhibit reverse engineering in accordance with one or more embodiments. A circuit design, as previously described, may be implemented on the programmable logic and interconnect resources of a programmable integrated circuit. Programmable ICs can include several different types of programmable logic blocks in the array. For example, FIG. 6 illustrates a type of programmable IC known as a field programmable gate array (FPGA) (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), e.g., clock ports, and other programmable logic 608 such as digital clock managers, analog-to-digital converters, system monitoring logic, and so forth. Some FPGAs also include dedicated processor blocks (PROC 610).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA, more than one adjacent column of CLBs is typically included wherever the CLBs appear, to facilitate the efficient implementation of user logic.

Figure 7:
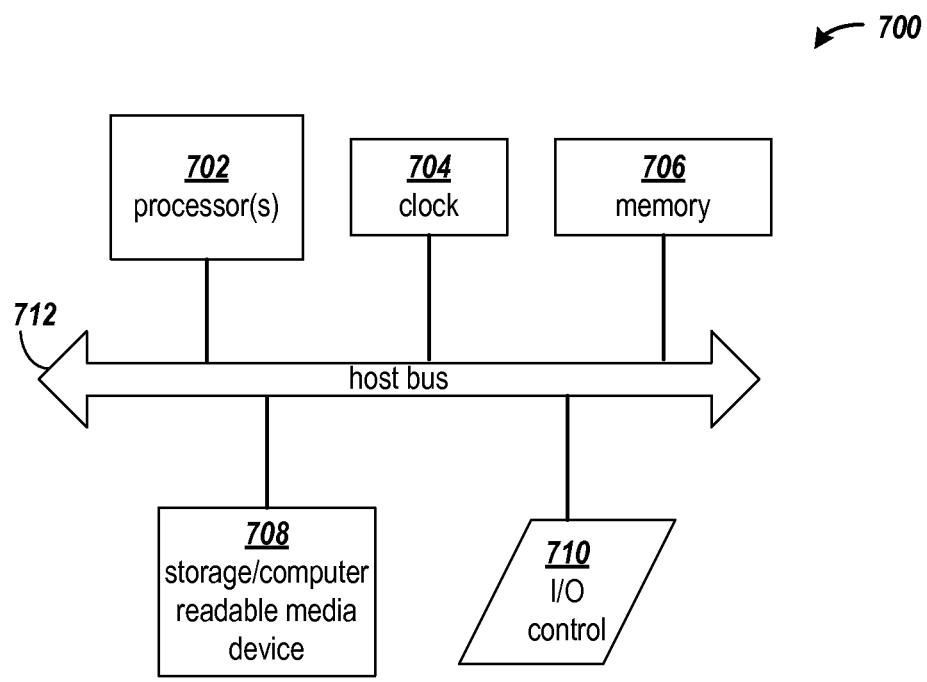
FIG. 7 illustrates a block diagram of a computing arrangement for implementing the processes described herein.

FIG. 7 shows a block diagram of an example computing arrangement that may be configured to implement the processes and functions described herein. It will be appreciated that various alternative computing arrangements, including one or more processors and a memory arrangement configured with program code, would be suitable for hosting the processes and data structures and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory unit 706, a storage unit 708, and an input/output control unit 710 coupled to a host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 702 may be one or more general purpose processors, or a combination of one or more general purpose processors and suitable co-processors, or one or more specialized processors (e.g., RISC, CISC, pipelined, etc.).

The memory arrangement 706 typically includes multiple levels of cache memory, and a main memory. The storage arrangement 708 may include local and/or remote persistent storage such as provided by magnetic disks (not shown), flash, EPROM, or other non-volatile data storage. The storage unit may be read or read/write capable. Further, the memory 706 and storage 708 may be combined in a single arrangement.

The processor arrangement 702 executes the software in storage 708 and/or memory 706 arrangements, reads data from and stores data to the storage 708 and/or memory 706 arrangements, and communicates with external devices through the input/output control arrangement 710. These functions are synchronized by the clock signal generator 704. The resource of the computing arrangement may be managed by either an operating system (not shown), or a hardware control unit (not shown).

The embodiments are thought to be applicable to a variety of systems and automated design tools for implementing circuit designs in programmable ICs. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method for synthesis of a hardware description language (HDL) design, comprising:
performing, on a programmed processor, operations including:
mapping the HDL circuit design to a plurality of hardware components of a target device using a first table that indicates for each of the hardware components, a respective first set of logic patterns that the hardware component is configurable to implement;
identifying hardware components of the target device to which no part of the circuit design was mapped as unused hardware components;
identifying, using a second table that indicates a second set of logic patterns that one of the unused hardware components is configurable to implement, a logic pattern of the circuit design that the one of the unused hardware components is capable of implementing;
wherein the second set of logic patterns is not associated with the one of the unused hardware components in the first table; and
remapping the circuit design having the identified logic pattern mapped to the one of the unused hardware components.

2. The method of claim 1, wherein:
the one of the unused hardware components is a multiplexor has at least two inputs; and
the identified logic pattern utilizes the multiplexor as a node connecting the at least two inputs.

3. The method of claim 1, wherein:
the one of the unused hardware components is a SERDES circuit having an input pin and an output pin; and
the identified logic pattern utilizes the SERDIES circuit as a node electrically connecting the input pin and the output pin.

4. The method of claim 1, wherein:
the identified logic pattern is the generation of a constant value; and
the one of the unused hardware components is an input/output circuit having an input pin and an output pin.

5. The method of claim 1, wherein:
the identified logic pattern is a gate; and
the one of the unused hardware components is a latch.

6. The method of claim 1, wherein:
the identified logic pattern is a latch; and
the one of the unused hardware components is a look-up-table.

7. The method of claim 6, wherein:
the look-up-table is configured to implement a function that outputs a first input in response to a hold signal and otherwise outputs a value of an output indicated by a set of address selection inputs; and the output of the look-up-table is coupled to the first input.

8. The processor-implemented method of claim 1, wherein:

the identified logic pattern is a gate; and the one of the unused hardware components is a flip-flop.

* * * * *